Aug. 16, 1960     E. H. WOOD     2,949,095
STARTING STALLS FOR USE ON RACECOURSES
Filed April 9, 1958     5 Sheets-Sheet 1
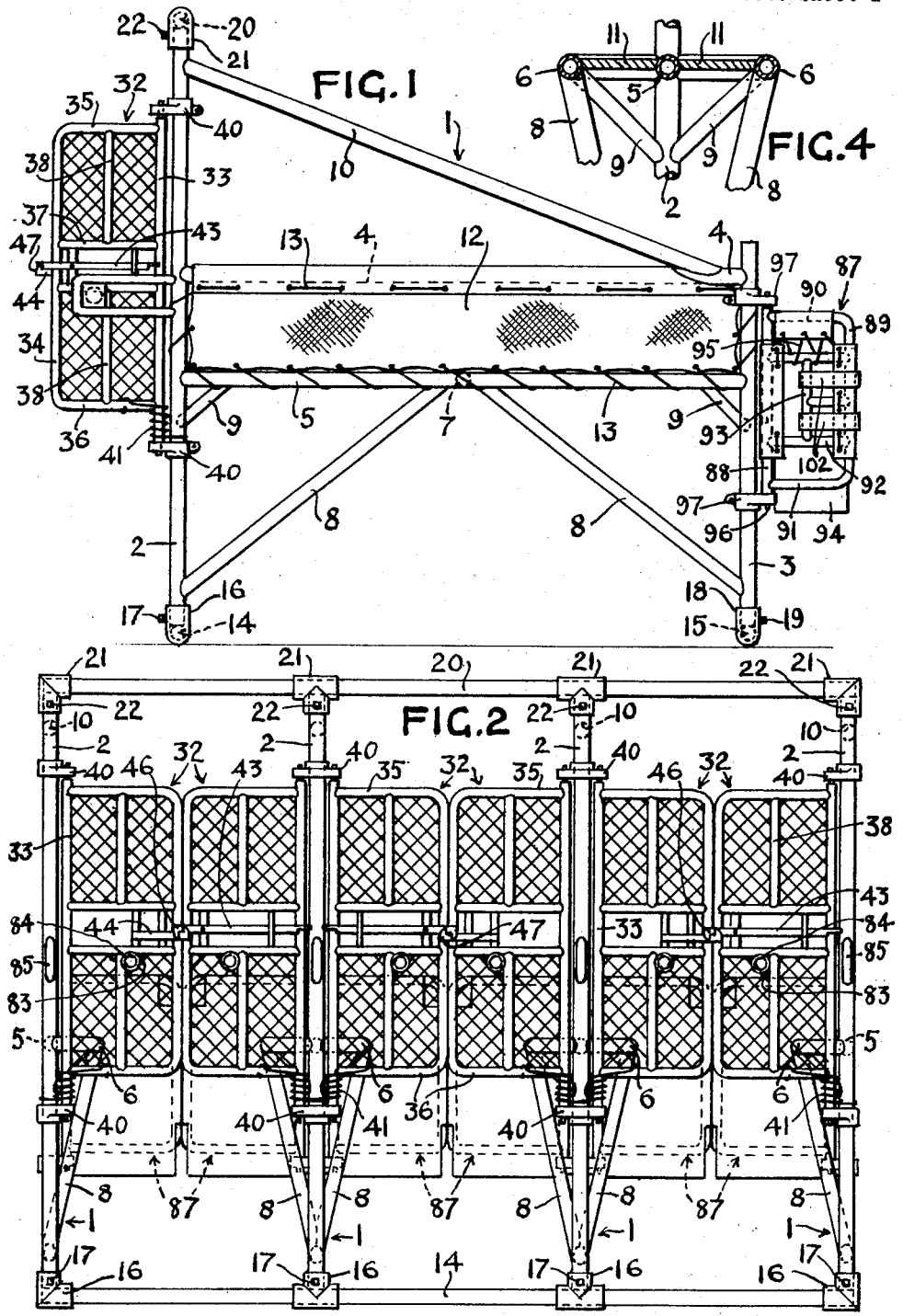

Aug. 16, 1960 E. H. WOOD 2,949,095
STARTING STALLS FOR USE ON RACECOURSES
Filed April 9, 1958 5 Sheets-Sheet 2
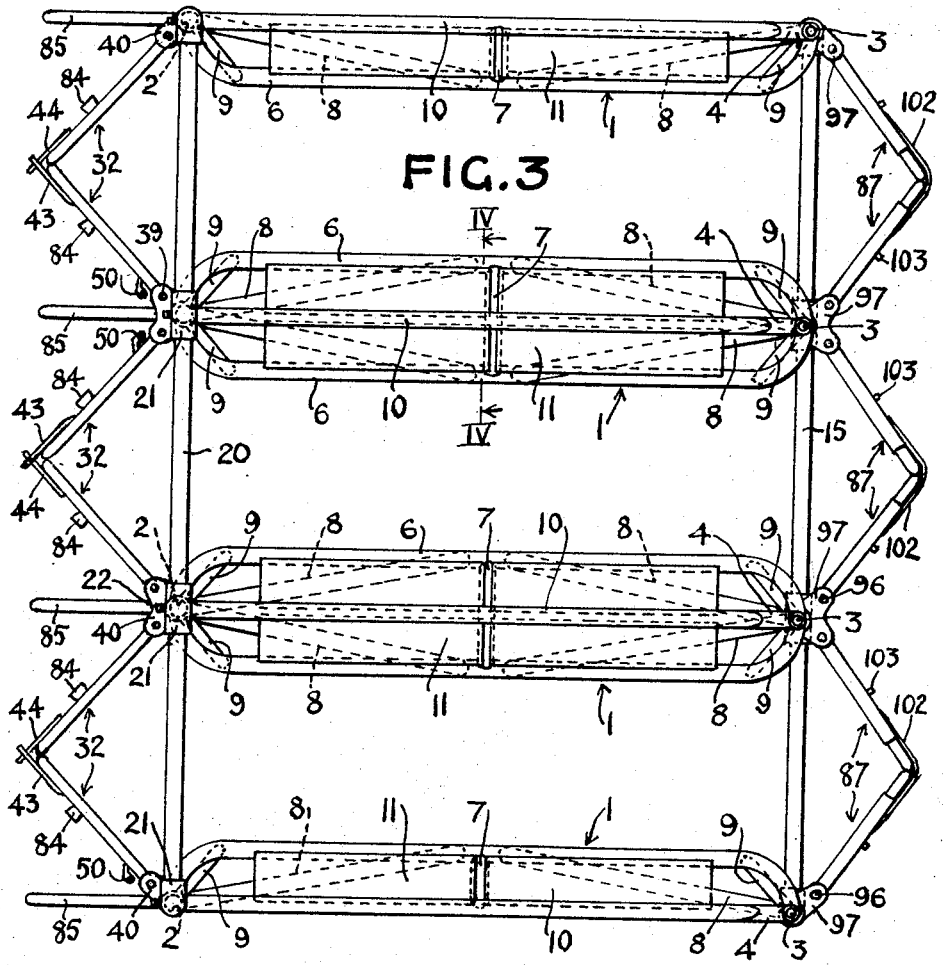
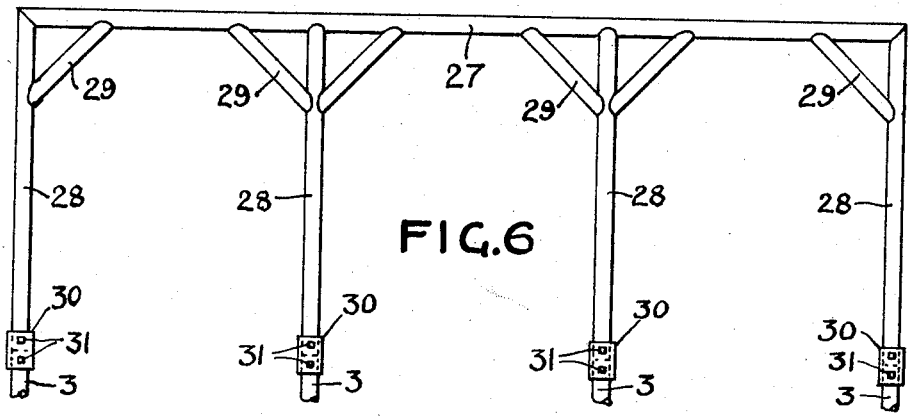

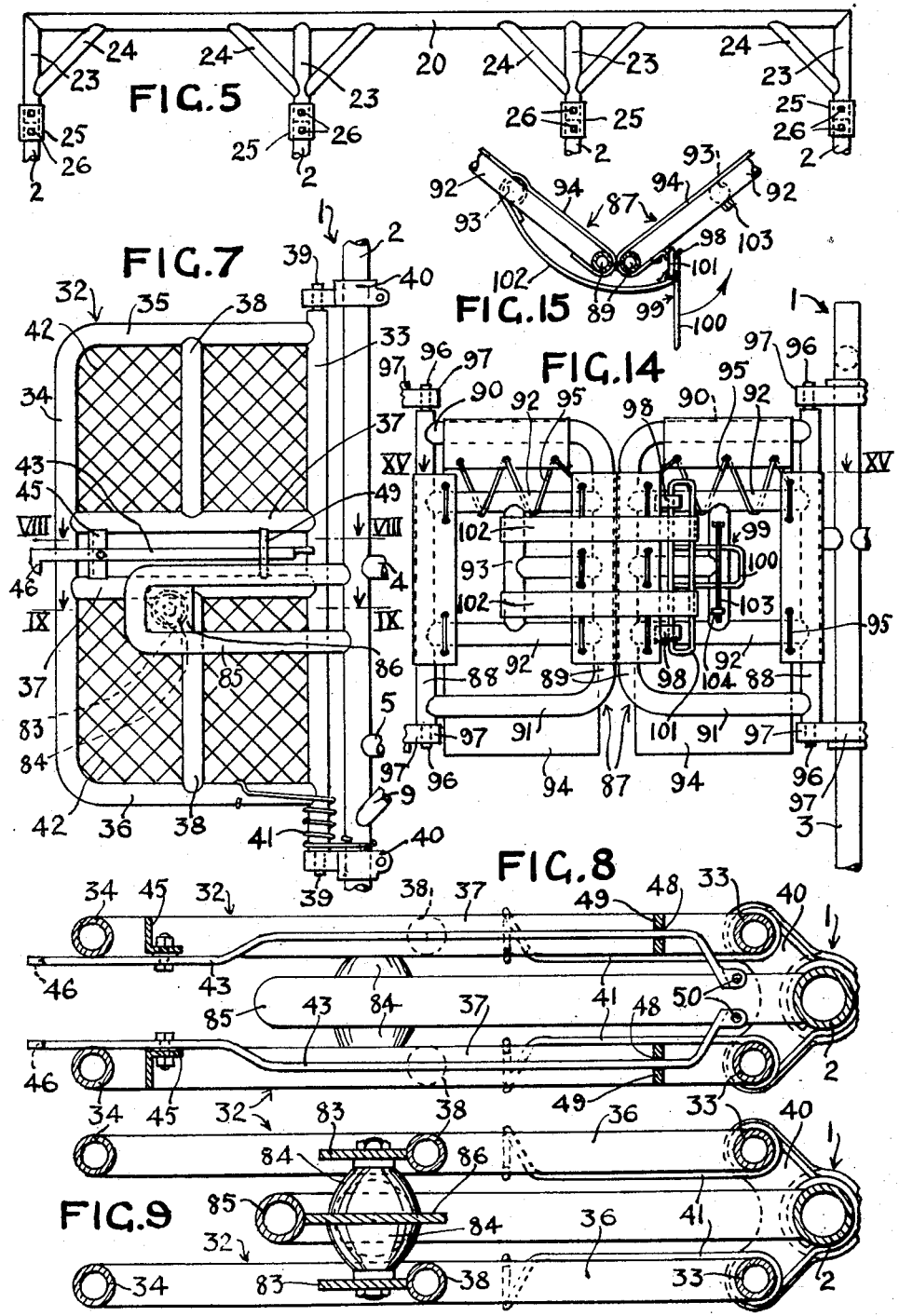

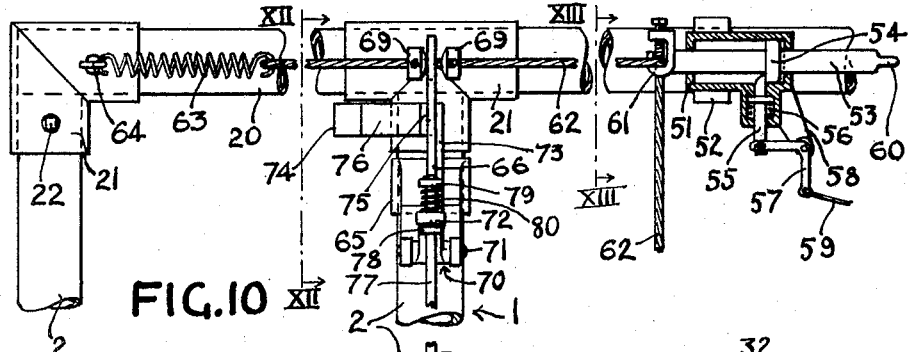
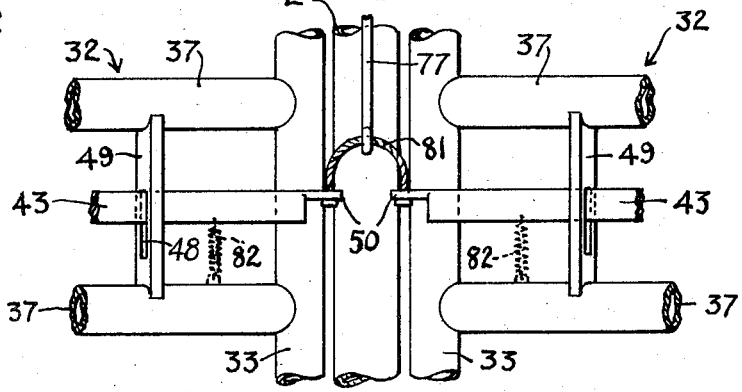
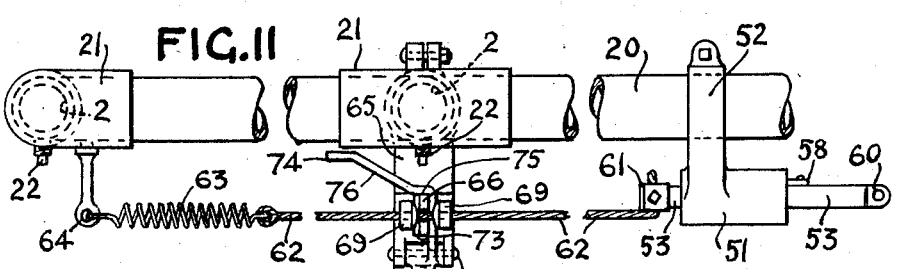
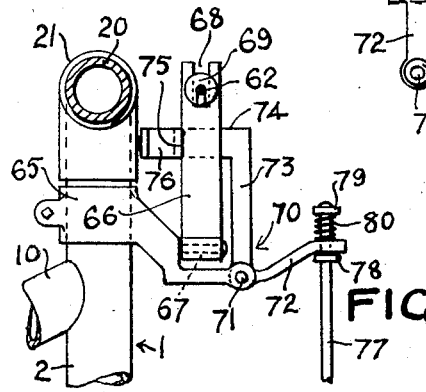
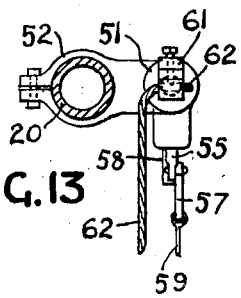

Aug. 16, 1960     E. H. WOOD     2,949,095
STARTING STALLS FOR USE ON RACECOURSES
Filed April 9, 1958     5 Sheets-Sheet 5
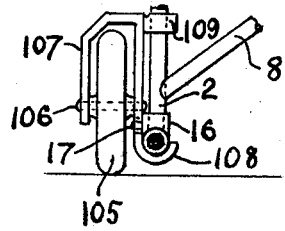
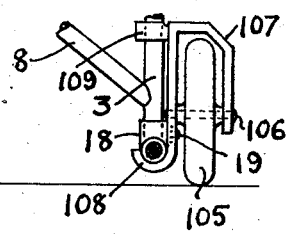
FIG. 16
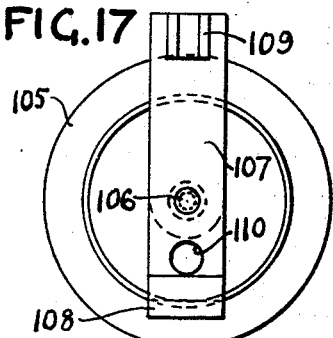
FIG. 17
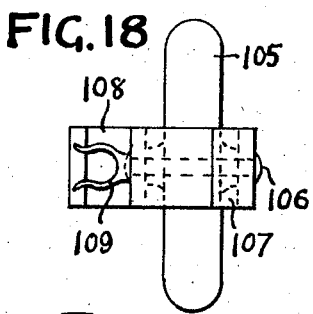
FIG. 18
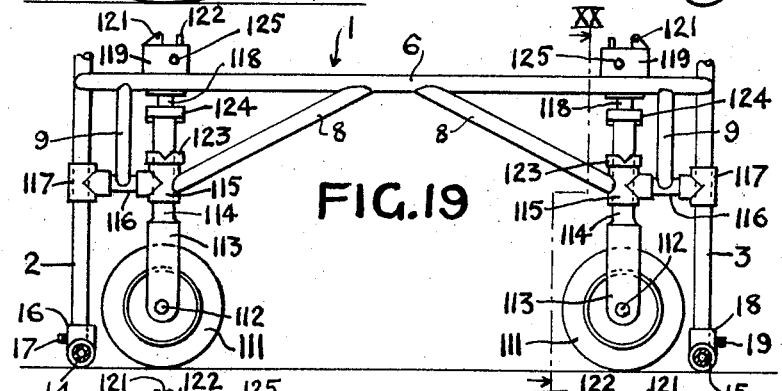
FIG. 19
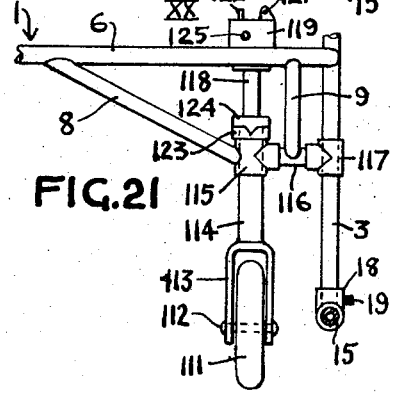
FIG. 20     FIG. 21

United States Patent Office 2,949,095
Patented Aug. 16, 1960

2,949,095

STARTING STALLS FOR USE ON RACECOURSES

Edwin Haswell Wood, Wairere Road, Belmont, Lower Hutt, Wellington, New Zealand

Filed Apr. 9, 1958, Ser. No. 727,379

Claims priority, application New Zealand Jan. 28, 1958

7 Claims. (Cl. 119—15.5)

The invention relates to starting stalls for use on racecourses for racing animals.

Two main types of starting stalls are at present in use.

In the first of these types, the individual stalls are defined by spaced partitions each consisting of a longitudinally extending rail having downturned end portions which act as legs and are engaged in holes in the ground. While such stalls have the merit of extreme simplicity, they suffer from a number of drawbacks. For one thing they are, at best, somewhat unstable, the reason for this being that the partitions do not co-operate in lending support to one another, each partition depending on its own degree of anchorage to the ground to hold it in place. For another thing, because of such instability, it is necessary to make the partitions as low as possible and this detracts from their ability to isolate one horse from the next. This leads to the further disadvantage that, when the stalls are fitted with exit gates, the latter must also be mounted in a low position, so low in fact that restive horses can easily leap over them. For a third thing, when erecting the several stalls to form a group it is necessary to manhandle each partition individually, the same applying when it becomes necessary to move the group out of the way or to change the starting position. This involves a good deal of manual labour, and occupies an appreciable amount of time.

In the second of the known types of stalls, several individual stalls are made as a single unit comprising a series of spaced partitions joined at the top to an overhead girder or gantry which spans the spaces between the partitions. With this arrangement the partitions, in effect, constitute legs which depend from the girder and on which the stall unit as a whole stands. This type of unit depends for its stability on the connections between the partitions and the overhead girder, and as the unit must be made in such a way that it can be moved from one position to another, it follows that the girder and partitions must not only be of very robust construction, but very firm and rigid connections must be provided between the components to avoid distortions and fractures during movement of the unit. These factors lead to the situation where the unit becomes not only very expensive to produce, but of great weight, so heavy in fact that, although fitted with wheels which can be lowered to take the weight, the unit requires the use of a power-driven tractor-vehicle to move it.

Generally speaking, the object of the present invention is to provide a starting stall unit in which the disadvantages and drawbacks existing in the known types of stalls to which reference has been made, are avoided.

More particularly, one of the objects of the invention is to provide a starting stall which is constructed in such manner that it has a high degree of stability when it is in use and while it is being moved from one position to another on the course, is of reasonably simple construction so that it can be produced at moderate cost, gives effective isolation between one horse and the next and is relatively light in weight so that it can easily be moved by manhandling.

Another object of the invention is to provide a starting stall which, in addtiion to having the attributes just previously mentioned, is constructed in such manner that it can be supplied from the factory in knocked-down condition and can easily be assembled on the site, thereby saving transport space, with a consequent saving in the cost of conveying it from the factory to the place of use.

Reference is now made to the accompanying drawings, in which:

Figure 1 is a side elevational view of a starting stall unit constructed in accordance with the invention, the unit being fitted with front and rear gates;

Figure 2 is a front elevational view of the unit;

Figure 3 is a plan view of the unit;

Figure 4 is a fragmentary cross-sectional view to an enlarged scale, on the line IV—IV of Figure 3;

Figure 5 is a front elevational view of an overhead fitting for application to the front end of the unit;

Figure 6 is a rear elevational view of an overhead reinforcement for application to the rear end of the unit;

Figure 7 is a face view of one of the front gates to an enlarged scale;

Figure 8 is a cross-sectional view, to a further enlarged scale, on the line VIII—VIII of Figure 7;

Figure 9 is a cross-sectional view, to the same scale as Figure 8, on the line IX—IX of Figure 7;

Figure 10 is a fragmentary front elevational view to a still further enlarged scale, illustrating release mechanism for the front gates;

Figure 11 is a plan view corresponding to Figure 10;

Figure 12 is a vertical sectional view on the line XII—XII of Figure 11;

Figure 13 is a vertical sectional view on the line XIII—XIII of Figure 12;

Figure 14 is a rear elevational view, to the same scale as Figure 7, of a pair of rear gates;

Figure 15 is a fragmentary sectional plan view showing how fastening means for a pair of rear gates are operated;

Figure 16 is a fragmentary side elevational view to the same scale as Figures 1 to 3, showing clip-on wheels applied to the unit;

Figure 17 is a face view of one of the wheels to an enlarged scale;

Figure 18 is a plan view corresponding to Figure 17;

Figure 19 is a fragmentary side elevational view of the unit, to the same scale as Figures 1 to 3, when fitted with wheels operated by hydraulic jacks, the wheels being shown in their inoperative positions;

Figure 20 is a vertical sectional view on the line XX—XX of Figure 19, and

Figure 21 is a side elevational view corresponding to part of Figure 19, but showing one of the wheels in its operative position.

Referring first to Figures 1 to 3, the unit is shown by way of example, to contain a total of three individual stalls in side-by-side relation, the unit thus having four vertical partitions, spaced apart in parallelism, and each generally indicated at 1. In this particular instance, and where there are more than three starters in a race, as will usually be the case, the additional accommodation needed for the horses can be provided by using several of the units and placing them side by side.

The partitions 1 are made from lengths of metal tubing joined together so that each partition is generally of openwork formation, the partitions being initially separate from each other so that, with other components to be described, they can be packed closely together for convenience of transport from the factory to the racecourse, or from one racecourse to another.

Each partition includes a front post 2 and a rear post 3, the front post being taller than the rear post, as clearly shown in Figure 1. The two posts 2 and 3 are held in an upright position and at the requisite distance apart by upper and lower mid-rails extending parallelly and horizontally between the two posts and joined to the latter, the upper one of the said rails being indicated at 4 and the lower one at 5 (see also Figure 4). In the same horizontal plane as and laterally spaced from the lower mid-rails 5, there are provided guard rails 6 the ends of which are curved into and joined to the front and rear posts 2 and 3 respectively so as to avoid the presence of sharp corners. For each intermediate partition 1 two guard or guide rails 6 are provided, one on either side of the lower mid-rails 5, while for each end partition only one such rail is provided, this rail being spaced from the inside edge of the corresponding lower mid-rail 5. With this arrangement, the guard rails 6 intrude partway into, and extend along each side, of every individual stall defined by two adjacent partitions, the guard rails thus acting as guides for keeping the horses in a central position when they enter the individual stalls. Centrally disposed stretcher tubes 7 (Figure 3) extend transversely between the guard rails 6 and their associated lower mid-rails 5. The guard rails 6 are braced to the front posts 2 and rear posts 3 by oppositely inclined tubes 8 extending from the middle portions of the guard rails to the lower end portions of the posts, the tubes at the same time acting to strengthen the lower portions of the posts. The guard rails 6 are further strengthened by short diagonal corner tubes 9 extending from the end portions of the rails 6 to the front and rear posts 2 and 3 respectively.

The parts of the front posts 2 lying above the upper mid-rails 4 are reinforced by rearwardly inclined top tubes 10 which extend from the upper end portions of the front posts to the rear end portions of the upper mid-rails 4.

The lower mid-rails 5, the guard rails 6 and stretcher tubes 7 to the support tread plates 11 (Figures 3 and 4) on which the jockeys can place their feet while the horses are being lined up in the stalls just prior to the actual start of a race.

The spaces between the upper and lower mid-rails 4 and 5 are preferably covered with canvas or plastic sheeting 12 (Figure 1) held in position by lacing 13, such covering providing the requisite degree of isolation between one stall and the next when the various partitions 1 have been erected at the necessary distance apart to form the several stalls.

The several partitions 1 are supported at the correct distance apart upon a front foundation tube or base member 14 and a rear foundation tube or base member 15, both tubes being arranged transversely of the partitions and extending entirely across the unit.

The front foundation tube 14 is provided with a series of upwardly extending sockets 16 corresponding in number to the number of partitions 1 included in the stall unit, and spaced apart to an extent corresponding to the desired spacing of the partitions. The lower end portions of the front posts 2 fit removably in these sockets and are held firmly in place by key-clamps or set-screws 17.

The rear foundation tube 15 is provided with a similar series of upwardly extending sockets 18, the lower end portions of the rear posts 3 fitting removably in these sockets and being held firmly in place by key-clamps or set screws 19.

In the erection of the stall unit, the foundation tubes 14 and 15 are laid on the ground at the requisite distance apart, with the sockets 16 and 18 pointing upwardly, and the lower end portions of the front posts 2 and rear posts 3 are engaged in the sockets of the respective tubes, whereupon the set-screws or key-clamps 17 and 19 are tightened up.

To inhibit any tendency for the partitions 1 to sway laterally on the foundation tubes 14 and 15, there is provided at the front end of the unit an overhead rail in the form of a tube 20 arranged transversely so that it spans the spaces between the individual partitions. This tube is provided with downwardly projecting sockets 21 which engage removably over the upper end portions of the front posts 2, the sockets being fitted with key-clamps or set-screws 22 for holding the overhead tube firmly in place.

Where extra resistance against lateral swaying of the partitions 1 is desired, the overhead tube or rail 20 may form part of a front lintel unit shown in Figure 5. Here, a series of short downwardly projecting tubular legs 23 are secured to the overhead tube 20, the legs being braced to the tube by means of short diagonal corner tubes 24. The legs 23 corresponding in number to the number of partitions 1 present in the stall unit and are spaced apart to the same extent as the partitions so that the lower ends of the legs rest on the upper ends of the front posts 2, the lintel unit being firmly secured to the posts by means of coupling sleeves 25 which are removably engaged around the lower end portions of the legs 23 and the upper end portions of the post 2 are secured to these portions by key-clamps or set-screws 26.

As the rear posts 3 are shorter than the front posts 2, their upper ends are left free so that the horses are not confronted with any obstruction when entering the individual stalls. Where, however, it is desired to reinforce the upper ends of the rear posts, use may be made of a rear lintel unit shown in Figure 6. This unit consists of a transversely disposed overhead rail in the form of a tube 27 to which a series of depending tubular legs 38 is secured, the legs being braced to the tube 27 by means of short diagonal corner tubes 29. The legs 28 correspond in number to the number of partitions 1 present in the stall unit, and are spaced apart to the same extent as the rear posts 3 so that the lower ends of the legs rest on the upper ends of the rear posts. To secure the rear lintel unit in position, there are provided coupling sleeves 30 removably engaged around the lower end portions of the legs 28 and the upper end portions of the posts 3, and secured to these portions by means of key-clamps or set-screws 31. The legs 28 are made of such length when the lintel has been secured in position, the rear overhead tube 27 will lie approximately at the same height as the front overhead tube 20, thereby giving the horses plenty of headroom when entering the individual stalls.

The stall unit is fitted with front gates generally indicated at 32, the gates being arranged in pairs, so that there are two gates for every individual stall, and the arrangement also being such that one gate of the pair is supported from one of the front posts 2, while the other gate of the same pair is supported from the next front post.

As shown most clearly in Figure 7, each gate is in the form of a tubular metal frame including an inner vertical stile 33 and an outer vertical stile 34 both joined by horizontal rails 35 and 36, and by two spaced intermediate horizontal rails 37. Centrally disposed vertical stretcher tubes 38 extend between the intermediate rails 37 and the top and bottom rails respectively.

The inner stile 33 has end portions projecting above and below the upper and lower rails 35 and 36, and formed with hinge pins or pivots 39 engaged rotatably in bearing holes in brackets 40 clamped to the associated front post 2 and spaced or recessed from guide rails 6. Around the lower projecting portion of the inner stile 33 there is arranged a helical spring 41 one end of which is anchored to the bottom rail 36, while the other end is anchored to the adjacent front post 2, the spring being in torsion so that it tends to swing the gate to open position.

The several gates 32 are made of such width that when the two of each pair are in closed position with their outer stiles 34 in abutment, they will, as best shown in Figure 3, lie in V-formation when viewed in plan and will project forwardly from the front end of the individual stall with which they are associated. This arrangement promotes a quick get-away when the gates are opened.

By reason of the fact that the front posts 2 are higher than the rear posts, being in fact taller than the horses, it becomes possible to arrange the front gates 32 in the most advantageous barrier position when they are closed. In this respect it has been found that the gates will be in the best position when they lie near the level of the horses' heads as they are then too high to be jumped over and it is already recognised that horses are reluctant to use their heads to break through a barrier.

The open parts of the gates lying above and below the intermediate rails 37 are covered with wire netting 42 which, while preventing the horses from putting their noses through the openings, still permit the horses to see through the gates, thereby further promoting a quick get-away when the gates are opened.

The front gates 32 are normally held in closed position by the provision, on one gate of a pair, of a releasable latch bar 43 engaged with a fixed keeper 44 (Figures 1, 2 and 3) on the other gate of the same pair. As best shown in Figures 7 and 8, the latch bar extends in the direction of the width of its gate and is pivotally mounted on a plate 45 secured to the intermediate rails 37 and arranged near the outer stile 34. The forward end portion of the latch bar 43 projects beyond the stile 34 and is formed with a downwardly projecting hook 46 engaging over a corresponding projecting portion of the keeper 44 on the companion gate, this portion of the keeper being formed with an upwardly projecting hook 47 co-operating with the hook 46 on the latch bar 43. The rearward end portion of the latch bar passes, with a working clearance, through a slot 48 (see also Figure 11), in a guide plate 49 secured to the intermediate rails 37 near the inner stile 33. At its rear end the latch bar 43 is formed with an eye 50 through the medium of which the bar can be connected to release mechanism.

Any suitable form of release mechanism may be employed. It is preferred, however, that the latch bars 43 be operated mechanically through a spring-loaded cable release mechanism under the control of the starting official, the use of electrical accessories for the purpose being avoided as such accessories not only necessitate provisions for supplying electric current, but are somewhat delicate and apt to be unreliable in operation.

Owing to space limitation, it is not convenient to illustrate release mechanism in Figures 1 to 3, but the preferred form of such mechanism is illustrated to an enlarged scale in Figures 10 to 13.

The release mechanism includes what may be termed a release gun having a horizontally extending cylinder 51 secured to the right-hand end portion of the overhead tube 20, or to an axial extension piece thereon, by means of a clamping bracket 52. A slidable plunger 53 extends axially through the cylinder 51 and is formed with a collar 54 (Figure 10) slidably engaged in the cylinder 51. The collar is normally maintained at the right-hand end of the cylinder 51 by means of a vertical pawl 55, the upper end part of which is formed as a nose and projects into the cylinder under the influence of a spring 56. The lower end of the pawl 55 is pivotally connected to one arm of a bell-crank lever 57 which, in turn, is pivotally supported on a bracket 58 depending from the cylinder 51. To the other arm of the bell-crank lever 57 there is connected a pull cord 59 (Figures 10 and 13) which can be operated by the starting official. The right-hand projecting end of the plunger 53 is formed with an eye 60 to which a cord can be connected so that the plunger and its collar 54 can by means of such cord, be restored to their initial right-hand position after having been moved to the left in a manner to be described.

The left-hand end of the plunger 53 is provided with a C-clamp 61 which grips a cable 62 extending along the front of the overhead tube 20. The left-hand end of the cable 62 is connected to one end of a helical tension spring 63 the other end of which is hooked to an eye-bolt 64 screwed into the socket 21 at the left-hand end of the overhead tube 20. The cable 62 is of greater length than the distance between the C-clamp 61 and the spring 63, so that, for a purpose to be described, the cable is left with a surplus portion depending freely from the C-clamp as is shown in Figures 10 and 13.

It has previously been stated that on the front gates 32 fitted with the latch bars 43, these bars are so arranged that their inner ends lie close to the posts 2 from which such gates are supported. To the upper end portion of each of these posts there is secured a bracket 65 which is designed as a clamp for gripping the post.

A vertically disposed plate 66 is pivotally supported, by its lower end, on the bracket 65 as indicated at 67 in Figure 12, the pivotal axes being horizontal but lying at right angles to the length of the cable 62. The plate 66 is thus mounted for a to-and-fro rocking movement in the direction of the length of the cable. The upper end of the plate 66 is formed with a vertical slot 68 through which the cable 62 freely passes. To the cable 62 there is adjustably and removably secured two collars 69 lying one on either side of the plate 66, the collars being so spaced and set that the plate is left with sufficient freedom to allow it to execute its rocking movement when such movement is imparted to it.

A double-armed lever generally indicated at 70 in Figure 12, is also pivotally supported on the bracket 65, as indicated at 71, the pivotal axis again being horizontal but, in this instance, extending in the direction of the length of the cable 62. The lever 70 has one arm 72 projecting forwardly and the other arm 73 projecting upwardly. The upper end of the arm 73 is made with a lateral extension 74 shaped to form a shoulder 75 normally engaging with the rear vertical edge of the plate 66. From the shoulder 75 the extension continues towards the left-hand end of the overhead tube 20 and is inclined towards the tube so as to form a cam surface 76.

The upper end portion of a downwardly extending operating rod 77 projects through a hole in the outer end of the arm 77 of the lever 70, the rod 77 being fitted with a collar 78 bearing on the underface of the lever-arm 77. The upper end of the rod is fitted with a further collar 79 and around the part of the rod lying between this collar and the lever-arm 77 there is provided a helical compression spring 80 for a purpose to be described. The lower end of the rod 77 is connected to the eye 50 on inner end of the latch bar 43 on that one of the associated pair of front gates 31 which is fitted with such bar. In the embodiment illustrated with reference to Figures 1 to 3, the stall unit has three individual stalls and thus three pairs of front gates 31, one gate of each pair being fitted with a latch bar 43. It will be seen from Figure 2, that two of the gates fitted with latch bars 43 are so arranged that both are slung from one and the same front posts 2, the eyes 50 on inner ends of the latch bars on these gates thus coming close to the same post. This makes it possible to use one operating rod 77 for both latch bars, thereby reducing the number of accessories required in the release mechanism. In this case, and as shown in Figure 10, the necessary connection between the lower end of the rod and the eyes 50 of the two latch bars can be effected through the medium of a wire yoke 81 which is sufficiently stiff to transmit movement from the rod to the latch bars but allows for variation in the distance between the two eyes while the gates are moving from closed to open position, or vice versa.

When the several gates 31 are in closed position, with the latch bar 43 of one gate of a pair in locking engagement with the keeper 44 on the other gate of the pair, the release mechanism is in the position shown in Figures 10 to 13. Here it will be seen that the plunger 53 of the release gun is held in its right-hand position by the pawl 55 so that the part of the cable 62 extending along the overhead tube 20 applies maximum tension to the spring 63. Under these conditions, the left-hand collar 69 on the cable bears against the left-hand face of the plate 66 and maintains the plate in a vertical position so that its inner edge is in engagement with the shoulder 75 on the lever 70 thereby holding the arm 72 of this lever in an elevated position. The arm 72, through the spring 80, exerts an upward pull on the operating rod 77 which, in turn exerts an upward pull on the inner end of the associated latch bar 43 (or bars) so that the hooked outer end of the bar is maintained in locking position.

To open the gates at the start of a race, the starting official pulls the cord 59 on the bell-crank lever 57 which is thus rocked in a direction causing downward movement of the pawl 55 against the pressure of its spring 56. The nose of the pawl is thus brought out of engagement with the collar 54 on the plunger 53 of the release gun, whereupon the spring 63 causes the cable 62 and plunger to move to the left until the collar 54 comes into engagement with the left-hand end of the cylinder 51. Movement of the cable 62 in the direction indicated causes the right-hand collar 69 on the cable to strike the plate 66 which is thus swung to the left so that its inner edge is moved out of engagement with the shoulder 75 on the lateral extension 74 of the arm 73 of the lever 70. The lever 70 is thus released so that the arm 73 swings forwardly and the arm 72 swings downwardly under the weight of the rod 77 and of the inner end portion of the latch bar 43 to which the rod is connected. The rod 77 thus moves downwardly and depresses the inner end of the latch bar, so that the hooked outer end 46 thereof is raised to releasing position. By downward movement of the several operating rods 77, all the gates will be released and will swing open simultaneously under the influence of their springs 41.

If desired, to promote downward movement of the rod 77 when the lever 70 is released, a tension spring may be connected between the inner end portion of the latch bar 43 and the lower end of the two intermediate rails 37 of the gate to which the bar is fitted, such spring being indicated in broken lines at 82 in Figure 10.

To reset the release mechanism, it suffices to pull the plunger 53 to the right either directly or by means of a cord attached to the eye 60. This causes the cable 62 and its collars 69 also to be moved to the right so that the spring 63 is re-tensioned. As the left-hand collar 69 moves to the right, it bears against and rocks the plate 66 to the right. In executing this movement, the inner edge of the plate 66 bears against the cam face 76 on the lateral extension 74 of the arm 73 of the lever 70, thus causing the arm 73 to be rocked rearwardly and the arm 72 upwardly. Such upward movement of the arm 72, acting through the spring 80, causes upward movement of the rod 77 which thus acts to restore the latch-bar 43 to locking position. As the plate 66 approaches its initial vertical position by pressure from the left-hand collar 69, its inner edge engages with the shoulder 75 on the lateral extension 74 of the arm 73 of the lever 70 thus holding the lever in its initial position ready for the next release operation. At the same time, as the collar 54 on the plunger 53 approaches its initial position, it bears on the nose of the pawl 55 and depresses the latter against the pressure of its spring 56, so that the collar moves past the pawl. As soon as the collar has reached its initial position, the pawl rises again and thus holds the release gun in re-charged position.

The gates can be fully closed after the release mechanism has been reset, as the spring 80 permits the rod 77 to move downwardly relatively to the lever arm 72 so a sufficient extent to allow the hooked end 46 of the latch bar 43 on one gate of a pair to ride over the keeper 44 on the companion gate.

Where there are more starters in a race than can be accommodated in the stall unit illustrated in Figures 1 to 3, the extra individual stalls required can be provided by using several of the units and placing them in close juxtaposition side-by-side. In such a case, the surplus portion of the cable 62 depending from the C-clamp 61, enables the effective length of the cable to be increased to allow for release of the extra gates, while still enabling a single release gun to be used for the combined units. For this purpose, the screw of the C-clamp 61 is loosened and instead of the spring 63 being anchored to the eye-bolt on the left-hand end of the first unit, it is anchored to a similar eye-bolt on the left-hand end of the next or last unit, the necessary extra length of cable being drawn through the C-clamp 51 the screw of which is then re-tightened. The necessary number of extra collars 69 are added to the cable for operating the plates 66 forming part of the lever systems applied to the extra unit, or each extra unit, that has been added to the first unit.

It has previously been mentioned that each intermediate post 2 of the unit carries two gates 32. From this it follows that when the various gates are released, the two gates on each intermediate post will swing towards one another under the influence of their springs 41 and, owing to their momentum, will normally move past their fully opened positions and thus collide with one another, causing noise and clatter and a tendency to rebound. The extreme end posts 2 carry only one gate each, and when these are released, their springs 41 will cause them to move past their fully opened position so that they will normally tend eventually to strike the sides of the unit, thus creating further noise and clatter.

Means are provided to overcome the drawbacks to which reference has already been made. To this end, and as shown in Figures 2, 3 and 7 to 9, each of the gates 32 is fitted with a corner plate 83 arranged at the junction between the lower intermediate rail 37 and the part of the stretcher tube 38 extending between this rail and the bottom rail 35, the plate 83 carrying an outwardly protruding combined buffer and suction cup 84 of rubber or similar resilient material.

Each of the front posts 2 carries a forwardly projecting outrigger 85 in the form of a tube bent to reclining U-shape, the inner ends of the two limbs of the tube being welded to the associated post 2. The outer end of the outrigger 85 carries an abutment plate 86 lying in the path of movement of the combined buffer and suction cup 84 on a gate.

With the arrangement just described, when the gates 32 swing open on release and reach their fully opened positions in which they project straight ahead, the combined buffers and suction cups 84 come into engagement with the abutment plates 86, thus preventing overswinging and avoiding consequent noise and clatter, while, at the same time, the combined buffers and suction cups will exert suction on the plates 86 thus preventing rebound.

The stall unit is also fitted with rear gates generally indicated at 87 in Figures 1, 2, 3, 14 and 15. As with the front gates 32, the rear gates 87 are arranged in pairs so that there are two gates for every individual stall, the arrangement also being such that one gate of the pair is supported from one of the rear posts 3, while the other gate of the same pair is supported from the next rear post.

As best shown in Figure 14 each rear gate 87 is in the form of a tubular metal frame including an inner vertical stile 88 and an outer vertical stile 89, both joined by a top rail 90 and a bottom rail 91, and by two spaced intermediate rails 92. A centrally disposed vertical stretcher tube 93 extends between the two intermediate rails 92. The spaces between the frame members of the gate are covered on the inside by an apron 94 of canvas or other suitable sheet material held in place by lacing 95.

The inner stile 88 has end portions projecting above and below the top and bottom rails 90 and 91, and formed with hinge pins 96 engaged rotatably in bearing holes in brackets 97 clamped to the associated rear post 3.

The rear gates 87 are made of such width that when the two gates of each pair are in closed position with their outer stiles 89 in abutment, they will, as best shown in Figures 3 and 15, be in V-formation when viewed in plan and will project rearwardly from the rear end of the individual stall with which they are associated. This arrangement, in conjunction with the V-arrangement of the front gates 32, gives the individual stalls ample length to accommodate the horses, while enabling the partitions to be made of minimum length.

The rear gates 87 are opened and closed by hand, and co-operating means are provided on the two gates of each pair for holding the gates firmly, but with some degree of resiliency, in their closed positions. To this end and as best shown in Figures 14 and 15, the intermediate rails 92 of one of the gates 87 are fitted with hooks 98 pointing towards the inner stile 88. For co-operation with these hooks there is provided a lever generally indicated at 99 and made from bent metal rods. The lever 99 is of reclining T-shape so that it has a horizontal stem acting as a handle 100 and a hooked vertical head 101. One end of a pair of horizontal straps 102 is secured to the part of the head 101 of the lever lying nearest the handle 100, while the other end of the straps is secured to the stretcher tube 93 on the other gate 87, that is to say, the gate not provided with the hooks 98.

When the two gates 87 of a pair have been swung to closed position, the part of the head 101 of the lever 99 most remote from the handle 100 is engaged in the hooks 98 so that the hooks act as a fulcrum for the lever as shown in Figure 15. The lever is then swung in the direction of the arrow in Figure 15, that is to say, towards the stile 88 of this gate and also towards the face of the gate, the result being that the straps 102 become tensioned and are drawn into close engagement with the abutting outer stiles 89 of both gates. The lever 99 is held in its operative position by a vertical retaining clip 103 which lies over the handle 100 and is pivoted at its upper end to the stretcher bar 93 on the gate fitted with the hooks 98, the lower end of the clip being releasably engaged in a hook 104 (Figure 14) on the bar 93.

Wheels may be provided to enable the unit to be moved with ease from one place to another on the course.

In Figures 16 to 18 there are shown wheel assemblies which although initially separate from the unit can be clipped on to the unit when desired. To this end, each wheel 105 is mounted for rotation on an axle 106 carried by the arms of a yoke 107. The lower end of one of the arms is formed as an outwardly and upwardly projecting hook 108 while on the upper end of the same arm there is provided a clip 109 projecting outwardly in the same direction as the hook 108.

Normally, it will be sufficient to provide no more than two clip-on wheels for the unit. To apply the wheels, the unit is tilted upwardly at one of its sides so that the front and rear foundation tubes 14 and 15 are partly raised from the ground. The hook 108 on the yoke 107 of one of the two wheels is now engaged beneath one of the sockets 16 on the front foundation tube 14 so that the clip 109 lies opposite the front post 2 evtending from this socket, whereupon the upper end of the yoke is pushed towards the post 2 so that the clip becomes fully engaged with the post.

The second wheel is applied to the unit in the same manner except that, in this instance, the hook 108 on the yoke 107 is engaged beneath one of the sockets 18 on the rear foundation tube 15, the clip 109 then being engaged with the rear post 3 extending from this socket.

When both wheels have been applied, the unit can be brought back to an even keel so that it is wholly supported on the wheels, thereby enabling it to be pushed or pulled over the ground with ease. As the wheels, when applied, are offset from the posts 2 and 3 with with the clips 109 are engaged, the weight of the unit will tend to keep the clips in engaged position.

The arms of the yokes 107 which are formed with the hooks 108, are also formed with holes 110 (Figure 17) to give clearance for the set screws 17 and 19 when the wheels are applied to the unit.

It will be apparent that the yokes 107 can easily be detached from the unit when the wheels 105 are no longer required.

Instead of providing clip-on wheel assemblies as described with reference to Figures 16 to 18, the unit may, as shown in Figures 19 to 21, be provided with permanent wheels 111 so mounted that they can be lowered into an operative position and raised to an inoperative position when desired.

As will be seen from Figures 19 to 21, the unit is provided with two wheels 111, one being arranged to the rear of one of the intermediate front posts 2, while the other is arranged to the front of the corresponding rear post 3, Certain minor modifications, to be described, are made in the construction of the partition 1 with which the two wheels 111 are associated, so as to ensure that the wheels are adequately supported.

The front wheel is mounted on an axle 112 carried by the arms of a yoke 113 which is joined to the lower end of the cylinder 114 of a hydraulic jack, the cylinder being disposed vertically. The cylinder is guided for vertical sliding movement in a sleeve 15 supported by a horizontal distance-piece 116 one end of which is connected to the sleeve, while the other end is joined to a socket 117 secured to the front posts 2. To lend adequate support for the sleeve 115, the forward inclined tubes 8, while extending from their guard rails 6, are formed to the sleeve, instead of to the post 2. Moreover, the forward diagonal tubes 9, while extending from the guard rails, are joined to the distance piece 116 instead of to the front post 2.

A hollow piston 118 fits slidably in the upper end of the cylinder 114 and is connected to a pump 119 mounted on a plate 120 (Figure 20) extending between the two guard rails 6. The plate 120 may form part of the tread plate 11 previously described, the rail 5 being omitted so as to facilitate the necessary connection being made between the pump 119 and the piston 118. The pump is adapted to be operated by a separate lever (not shown) which can, when desired, be connected to a fulcrum pin 121 on the pump so that it can be used for reciprocating a spring-pressed plunger 122 forming part of the pump.

A toothed dog 123 is formed on or secured to the upper end of the sleeve 115, while a corresponding toothed dog 124 is provided on the upper end of the cylinder 114.

The rear wheel 110 assembly is of exactly the same form as the front wheel assembly except that, in this instance the distance-piece 116 extends between the sleeve 115 and the rear post 3.

When the wheels 111 are in their inoperative positions in which the front and rear foundation tubes 14 and 15 rest on the ground, the wheels extend in the direction of the length of the partition 1 as shown in Figures 19 and 20. They thus lie well within the lateral bounds defined by the guide rails 6 and are thereby protected by the rails against being kicked or stumbled over by the horses when moving into and standing in the individual stalls.

When it is desired to raise the stall unit on to the wheels, these are first turned by 90° about the axes of the jacks so that they then extend transversely of the unit as indicated in Figure 21. The pumps 119 are now operated to cause pressure liquid to flow through the pistons 118 and thus moving downwardly through the sleeves 115 with consequent downward movement of the wheels and upward movement of the unit. The unit is thus supported on the wheels and, being brought on to an even keel, can be moved with ease. When the wheels have been extended to their maximum extent, the dogs 124 on the cylinders 114 come into engagement with the dogs 123 on the sleeves 115, as shown in Figure 21, thus preventing the wheels from swivelling about the axes of the jacks while the unit is being rolled from one place to another.

The wheels are returned to inoperative position by operating by-pass valves 125 on the pumps 119.

The jacks are constructed in accordance with well-known principles and need not be described in further detail.

Where two wheels are provided for the unit, as described with reference to Figures 16 to 18 or 19 to 21, and several of the units are used side-by-side, the units may be connected together by C-clamps or other couplings, so that when the wheels are in operative position, one unit will assist in keeping the other unit on an even keel while the assembly as a whole is being moved by manhandling or towing.

By reason mainly of the fact that a starting stall unit when constructed in accordance with the invention includes transversely disposed ground-engaging foundation tubes 14 and 15, it is possible to make the unit of light-weight construction, consistent with great strength and rigidity, an advantage not attainable in previous constructions. The view may be held that the presence of the said tubes will constitute a hazard as they lie transversely of the path of movement of the horses. Tests and observations have, however, proved this view to be fallacious, especially bearing in mind the tubes will adequately serve their purpose even when they are of relatively small diameter—say not more than two inches. In any case, the possibility presents itself of seating either one or each of the foundation tubes in a shallow groove or depression previously formed in the ground. In practice it is found desirable to adopt this expedient in regard at least to the rear tube as the keying effect then produced between the tube and the ground will prevent movement of the unit should a troublesome horse, when standing in its stall, back into the gear gates 87 after these have been closed and fastened.

I claim:
1. A starting unit for racing animals comprising a plurality of spaced vertical partitions defining stalls in side-by-side relation, guide rails on said vertical partitions and spaced from the ground, said guide rails extending into said stalls for centering the animals therein, base members at opposite ends of the partitions and operatively associated therewith in detachable relation to support the same on the ground, said base members being substantially rectilinear and horizontal members extending completely across said unit, an overhead rail extending completely across said unit and operatively associated with said partitions in detachable relation to secure the partitions in position, tread plates on said guide rails for supporting riders for the animals in the stalls, pivots on the vertical partitions at the fronts of the stalls whereby said pivots are off-set from said guide rails, and gates on the pivots for releasing said animals.

2. A unit as claimed in claim 1 comprising a cable extending transversely across the unit, means connecting the cable resiliently to a side of said unit, means detachably engaging the cable at the other side of the unit to hold the cable taut against the resilient force of the first said means, the second said means being adapted for releasing said cable, and means operatively associated with the cable and gates to open said gates in response to a releasing of said cable.

3. A unit as claimed in claim 1 wherein the gates for each stall project forwardly in V-shape.

4. A unit as claimed in claim 1 comprising abutment plates on and extending forwardly of said partitions and buffers on the gates for engaging the abutment plates when the gates are opened.

5. A unit as claimed in claim 1 comprising rear gates on the partitions for each of the stalls and means operatively associated with the rear gates and releasably maintaining the rear gates closed.

6. A unit as claimed in claim 1 comprising wheels detachably affixed to said partitions.

7. A unit as claimed in claim 1 comprising wheels and hydraulic jacks supporting the wheels on said partitions.

References Cited in the file of this patent

UNITED STATES PATENTS

| | | |
|---|---|---|
| 2,200,504 | Keen | May 14, 1940 |
| 2,273,493 | McMillan | Feb. 17, 1942 |
| 2,381,903 | Goodman | Aug. 14, 1945 |
| 2,653,568 | Lawson | Sept. 29, 1952 |